United States Patent
Durling

(10) Patent No.: US 10,378,625 B2
(45) Date of Patent: Aug. 13, 2019

(54) MOUNTING ARRANGEMENT FOR A GEAR BOX

(71) Applicant: ROLLS-ROYCE plc, London (GB)

(72) Inventor: Christopher J Durling, Bristol (GB)

(73) Assignee: ROLLS-ROYCE plc, London (GB)

(*) Notice: Subject to any disclaimer, the term of this patent is extended or adjusted under 35 U.S.C. 154(b) by 149 days.

(21) Appl. No.: 15/645,512

(22) Filed: Jul. 10, 2017

(65) Prior Publication Data

US 2018/0023676 A1 Jan. 25, 2018

(30) Foreign Application Priority Data

Jul. 21, 2016 (GB) .................................. 1612623.7

(51) Int. Cl.
*F16H 1/28* (2006.01)
*F16H 35/06* (2006.01)
(Continued)

(52) U.S. Cl.
CPC ............... *F16H 35/06* (2013.01); *F02C 7/36* (2013.01); *F02K 3/06* (2013.01); *F16F 1/16* (2013.01);
(Continued)

(58) Field of Classification Search
CPC .. F16H 35/06; F16H 1/2818; F16H 2055/176; F02K 3/06; F16D 3/12;
(Continued)

(56) References Cited

U.S. PATENT DOCUMENTS 3,090,258 A * 5/1963 Zink .................. F16H 1/46
475/338
3,583,825 A 6/1971 Sadler et al.
(Continued)

FOREIGN PATENT DOCUMENTS

FR 1552184 A 1/1969
FR 2 592 450 A1 7/1987
(Continued)

OTHER PUBLICATIONS

Oct. 25, 2018 Office Action issued in European Patent Application No. 17180440.4.
(Continued)

*Primary Examiner* — David J Hlavka
(74) *Attorney, Agent, or Firm* — Oliff PLC

(57) ABSTRACT

A ring gear arrangement, including: a ring gear mount including: a ring gear having at least one internal gear for interaction with one or more gear wheels; a ring gear stator; and, a plurality of couplings which locate the ring gear within the gear stator, each coupling having a drive arm connected to the ring gear and a resiliently deformable connection, wherein the drive arm is movable between a first position in which the ring gear is in a rest position and a second position in which the ring gear has undergone some radial or rotational movement relative to the ring gear stator, wherein movement of the drive arm from a the first position to the second position loads the resiliently deformable connection against the ring gear, wherein the resiliently deformable connection biases the drive arm to return to the first position when in the second position.

17 Claims, 5 Drawing Sheets

(51) Int. Cl.
  *F02C 7/36* (2006.01)
  *F02K 3/06* (2006.01)
  *F16L 3/12* (2006.01)
  *F16F 1/16* (2006.01)
  *F16F 15/121* (2006.01)
  *F16H 55/17* (2006.01)

(52) U.S. Cl.
  CPC ........... *F16F 15/1216* (2013.01); *F16H 1/28* (2013.01); *F16H 1/2818* (2013.01); *F16L 3/12* (2013.01); *F16F 2238/024* (2013.01); *F16H 2055/176* (2013.01)

(58) Field of Classification Search
  CPC .... F16F 15/1216; F16F 1/16; F16F 2238/024; F02C 7/36
  See application file for complete search history.

(56) References Cited

U.S. PATENT DOCUMENTS

| | | | | |
|---|---|---|---|---|
| 4,282,776 A | * | 8/1981 | Eller | F16H 1/28 475/149 |
| 4,503,719 A | * | 3/1985 | Hamano | F02N 15/046 475/347 |
| 5,533,415 A | * | 7/1996 | Ackermann | F02N 15/046 74/7 E |
| 5,685,798 A | * | 11/1997 | Lutz | B60K 1/02 180/65.51 |
| 5,797,185 A | | 8/1998 | Sammataro et al. | |
| 8,523,732 B2 | * | 9/2013 | Le Moal | F16F 15/13157 475/347 |
| 2005/0028619 A1 | * | 2/2005 | Chane-Waye | F16D 3/68 74/7 E |
| 2013/0310213 A1 | | 11/2013 | Matsuoka et al. | |

FOREIGN PATENT DOCUMENTS

| | | |
|---|---|---|
| GB | 735593 A | 8/1955 |
| GB | 2002488 A | 2/1979 |
| GB | 2107425 A | 4/1983 |

OTHER PUBLICATIONS

Jan. 5, 2017 Search Report issued in British Patent Application No. GB1612623.7.

Nov. 29, 2017 Search Report issued in European Patent Application No. 17180440.

* cited by examiner

MOUNTING ARRANGEMENT FOR A GEAR BOX

TECHNICAL FIELD OF INVENTION

The present invention relates to a mounting arrangement for a gearbox. In particular, the gearbox is a planetary gearbox.

BACKGROUND OF INVENTION

Current trends in gas turbine engines are moving towards so-called geared turbofan engines in which the fan is driven through a reduction gear train. The gear train allows the low pressure spool to be driven at higher rotational speeds, which provides for a more efficient lighter engine core, whilst reducing the speed of the fan, which allows it to have a larger diameter and enable a higher bypass ratio. The reduction gear trains may be epicyclically configured where the fan is driven via the carrier of a planetary configuration, or a star configuration where the planet gears are fixed and the fan shaft is driven by the ring or star gear.

FIG. 1 shows a geared gas turbine engine 10 having a fan 12, low and high pressure spools, each having respective compressors and turbines driveably interconnected by respective shafts which are rotatable about a principal axis. Thus, there is a low pressure compressor 15 connected to the low pressure turbine 19 via a low pressure shaft, and a high pressure compressor 16 connected to a high pressure turbine 18 via a high pressure shaft. The low 15 and high 16 pressure compressors progressively compress air from an inlet downstream of a fan 12 to an outlet in flow proximity to the combustor 17. Compressed air flows from the high pressure compressor 16 to the combustor 17 in which fuel is added and the mixture burnt. The combusted gas then expands through and drives the high 18 and low 19 pressure turbines in flow series. The low and high pressure shafts interconnect the respective turbines and compressors to provide the drive for the compressors.

The fan 12 is located at the front of the engine 10 to provide air for the inlet of the compressors and the main propulsive flow which is channelled down the bypass duct 22. The fan 12 is driveably connected to the low pressure shaft via a gear train 14 in the form of an epicyclic reduction gear box. The gear train 14 is located between the low pressure shaft and the fan 12 and is arranged to reduce the speed of the fan 12 relative to the speed of the low pressure turbine 19. Such an arrangement allows for a higher speed and more efficient low pressure turbine 19 together with a slow spinning larger fan which can provide a higher bypass ratio. This combination allows the speed of the fan and low pressure turbine to be independently optimised.

The fan 12 has a plurality fan blades 13 extending radially from a hub which is mounted so as to rotate about the principal axis of the engine 10. The fan 12 resides within a fan casing 21 which partially defines the bypass duct 22. An engine casing surrounds the engine core which comprises the low and high pressure spools and combustor 17. The engine casing generally provides containment and structural support for the engine core. The engine casing is ultimately attached to and supported by the wing of the aircraft via an appropriate arrangement of struts which extend across the bypass duct and the nacelle which attaches to a pylon as is well known in the art.

The gear train 14 is in the form of an epicyclic reduction gearbox which is driven in a planetary configuration. The gear train 14 includes a ring or annular gear which is heldsubstantially stationary in relation to the engine casing, a planet gear set with individual planets gears interconnected via a carrier, and a sun gear. The sun gear is rotatably connected to the low pressure shaft. The fan 12 is connected to the output shaft of the gearbox which is in the form of the carrier of the planet gear via a fan shafting arrangement.

Generally, planetary gearboxes are used in power transmission systems across many industries including, for example: automotive, wind turbines, aerospace and marine. In its simplest form, it comprises a central gear or sun gear surrounded by multiple planet gears mounted on a single concentric carrier, which in turn sits within a single concentric ring gear which has internal gear teeth for engagement with the planets.

In operation, one of the sun gear, planet carrier and ring gear are held stationary with the other two providing an input and an output to the gearbox. The selection of the stator, input and output determines the gear ratio of the gearbox and allows for several drive variations, as are known in the art.

A common variation for high power density gear boxes is to provide a stationary ring gear, a sun gear input with the planet gear carrier driving the output shaft. When using such a configuration, the stationary ring gear should be constrained in such a way that it can accommodate build tolerances and avoid deleterious stress on the supporting structures, gears and bearings, in service.

The present invention seeks to provide an improved ring gear mount for a planetary gearbox.

STATEMENTS OF INVENTION

The invention provide a ring gear, arrangement according to the appended claims.

Described below is a ring gear arrangement, comprising: a ring gear mount comprising: a ring gear having at least one internal gear for interaction with one or more gear wheels. The ring gear mount may include a ring gear stator. The ring gear mount may include a plurality of couplings which locate the ring gear within the gear stator. Each coupling may have a drive arm connected to the ring gear and a resiliently deformable connection. The drive arm may be movable between a first position in which the ring gear is in a rest position and a second position in which the ring gear has undergone radial or rotational movement relative to the ring gear stator. The movement of the drive arm from a first position to the second position may load the resiliently deformable connection against the ring gear. The resiliently deformable connection may bias the drive arm to return to the first position when in the second position.

Providing a ring gear mount with a stator and plurality of couplings having at least one drive arm and at least one resiliently deformable connection allows the ring gear to move relative to the stator to provide a floating ring gear which is free to move with the planet and sun gears. Such an arrangement can reduce the loading on the various gears of an epicyclic gearbox.

The ring gear mounting arrangement may be for use with a planetary gear train. The planetary gear train may include a plurality of gear wheels held in rotatable relation to one another by a carrier structure.

The connection of the drive arm to the drive arm stator may be directly, or may be through an intermediate structure. The intermediate structure may be the engine casing or an appendage therefrom. The resiliently deformable connection may be connected directly to the stator, or may connected via a lever. There may be a plurality of resiliently deformable connections.

The couplings may be configured to allow the ring gear to rotate and move in any radial direction. The couplings may restrict any out of plane or axial movements of the ring gear.

The resiliently deformable connection may be a torsion bar.

The ring gear may have a principal axis about which the one or more gear wheels rotate. The longitudinal axis of the torsion bar may lie parallel to the principal axis. The principal axis of rotation may be the axis about which a planet carrier rotates.

The drive arm may include a first drive member and a second drive member in series connection between the ring gear and ring gear stator.

The drive arms may be elongate members each having a longitudinal axis. The longitudinal axes of the first and second drive members may be acutely inclined to one another when in a neutral position.

The angle between the longitudinal axes of the first and second drive members may be between 0 and 30 degrees.

A neutral position corresponds to the position when the resilient member is not biased. The first and second drive members may sit in a common plane. The plane may be the plane defined by the ring gear. The plane may be normal to the principal axis of the ring gear. The drive members may be straight. In the case where the drive members are curved, the longitudinal axis of the drive members may be provided by the line which extends between their respective connecting ends.

A first end of the drive arm may connect to the ring gear and a second end of the drive arm may connect to the torsion bar at a torqued end. The opposing end of the torsion bar may connect to a static structure. The static structure may be the ring gear stator or an extension thereof. The static structure may be an engine casing or extension thereof. The torsion bar may be rotatably supported by the ring gear stator. The rotatable support may be provided by one or more bearings. The torsion bar may extend through the ring stator.

The drive arms may lie in an orthogonal plane to the longitudinal axis of the torsion bar. The orthogonal plane may be the same as or parallel to the ring gear.

The resiliently deformable connection may be connected to the static structure via a lever.

The ring gear arrangement may further comprise a plurality of non-resilient drive arms connecting the ring gear to the ring gear stator. Thus, the ring gear can be connected by a plurality of couplings. A first group of the couplings may include a resiliently deformable connection. A second group of couplings may have a drive and no resiliently deformable connection such that the drive arm connects the ring gear directly to the ring gear stator.

The drive arm and resiliently deformable connection may lie in a common plane.

The ring gear arrangement may further comprise a lever and drive arm in an end-to-end series arrangement in which the lever and drive arm being joined by a resiliently deformable hinge portion.

The drive arm and resiliently deformable portion may be a unitary body.

Also described is a planetary gear box having a ring gear arrangement as described, and a gas turbine engine including a gear box with the ring gear arrangement.

Within the scope of this application it is expressly envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

In the description below, unless otherwise stated, the geometric references for axial and circumferential should be taken with reference to the principal axis of the gas turbine engine. The terms upstream and downstream should be taken with reference to the flow stream of the main gas path through the engine. Inward and outward facing surfaces should be taken with reference to the rotor surfaces.

DESCRIPTION OF DRAWINGS

Embodiments of the invention will now be described with the aid of the following drawings of which.

DETAILED DESCRIPTION OF INVENTION

Figure 1:
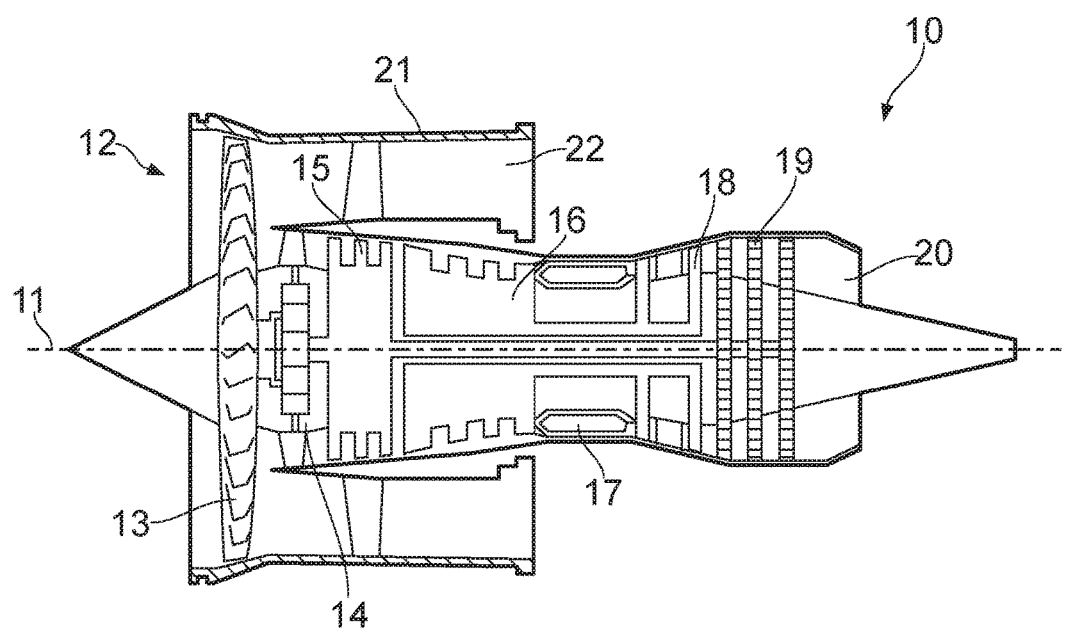
FIG. 1 shows a schematic longitudinal section of a geared turbofan gas turbine engine.
Figure 2:
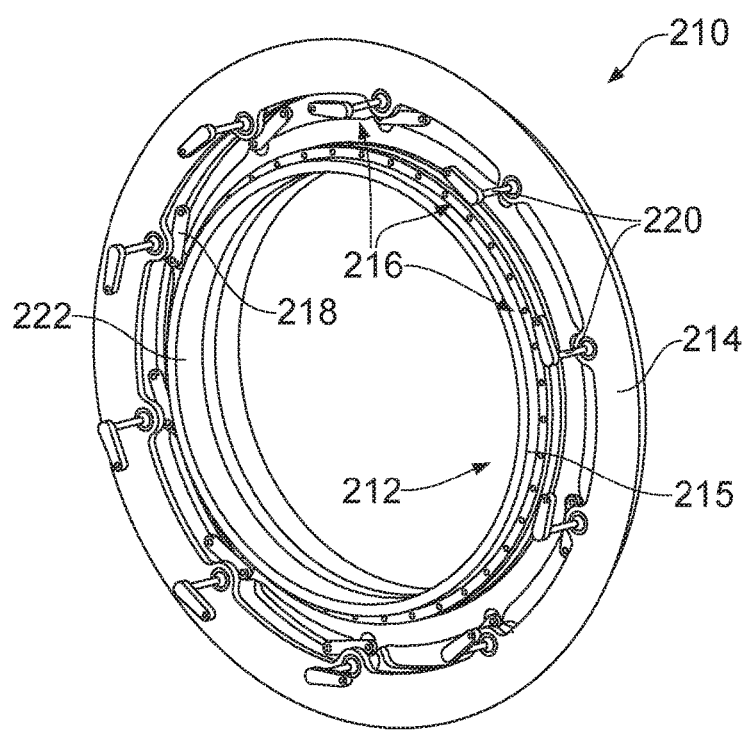
FIG. 2 shows a perspective view of a ring gear mount according to the present invention.
Figure 3:
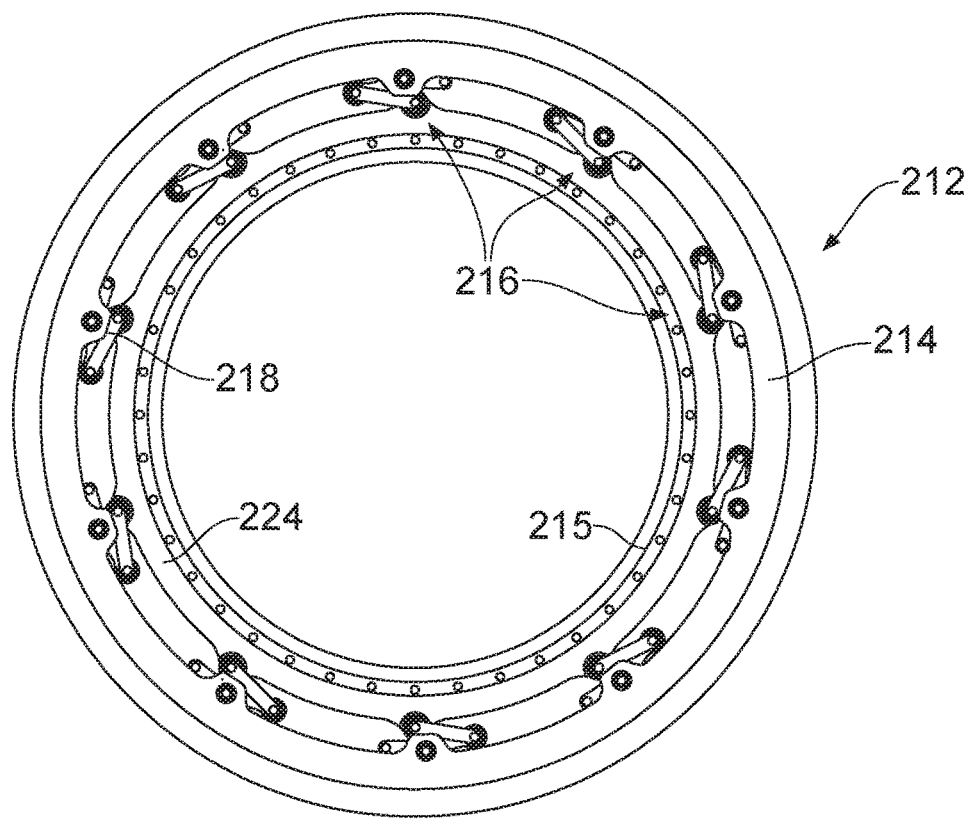
FIG. 3 shows an axial end view of the ring gear mount shown in FIG. 1.
Figure 4:
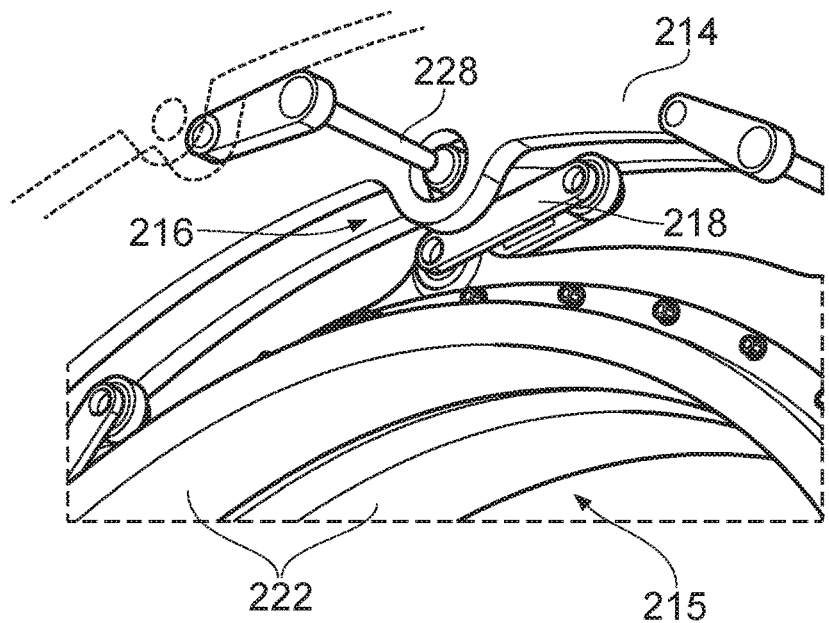
FIG. 4 shows an arcuate section of the ring gear mount shown in FIG. 1 to highlight the torsion coupling.
Figure 5:
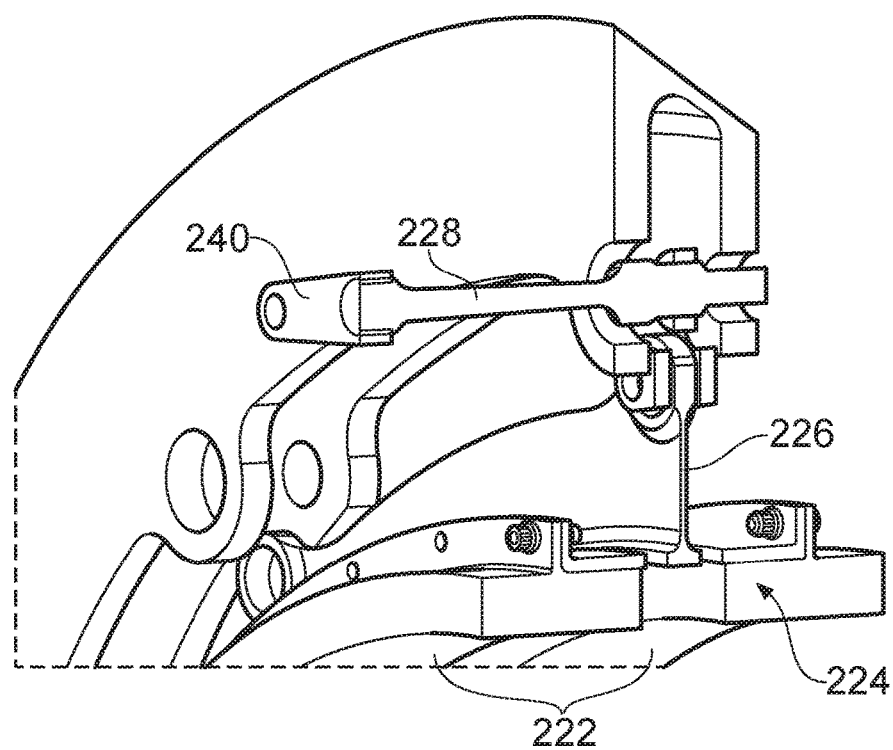
FIGS. 5 and 6 shows a longitudinal partial sections of the ring gear mount in opposing circumferential directions.
Figure 6:
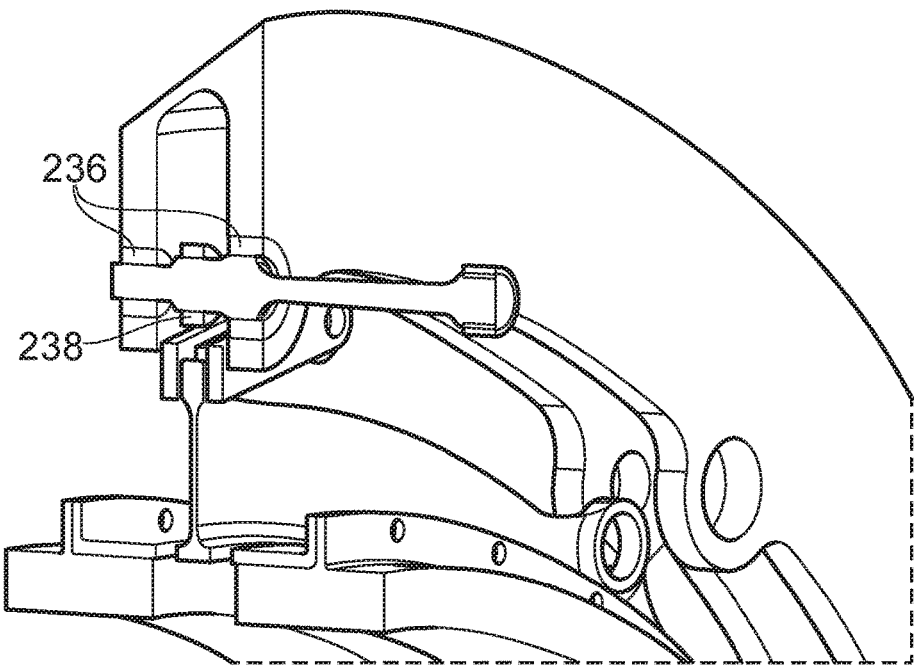

FIGS. 2 to 10 show ring gear arrangements for use with a planetary gear train, such as the one described in relation to FIG. 1 and for other applications outside of the aerospace industry, such as wind turbines of marine propulsion systems. The described ring gear arrangement 210, comprise: a ring gear mount 212 including: a ring gear stator 214 and a plurality of couplings 216 having at least one drive arm 218 and at least one resiliently deformable connection 220. The movement of the drive arm 218 from a rest position loads the resiliently deformable connection 220 against the ring gear stator 214. When loaded the resiliently deformable connections 220 biases the drive arm 218 to return to the rest position. The arrangement also includes a ring gear 215 having at least one internal gear for interaction with one or more gear wheels.

The ring gear 215 is an annular internal gear which forms part of the planetary gear train and driveably engages with the planet gears which are held in a rotational relation by a carrier. The ring gear 215 is located within and is supported by the engine casing by a ring gear mount 212. Referring to FIGS. 2 to 8, the ring gear mount 212 includes a stator 214 and a plurality of resiliently deformable connections 220 in the form of torsion couplings which attach the ring gear 215 to the ring gear stator 214. The plurality of torsion couplings may be equidistantly circumferentially distributed around the stator 214 and allow relative movement of the ring gear 215 within the stator 214. The movement of the ring gear 215 may be rotational around the principal axis of the gear box and in any radial direction.

In providing such a movement, the ring gear mount 212 allows the ring gear 215 to self-centre during running and allows for the rotational load on the gear box 14 to be taken up with improved load distribution on the ring gear. The ring gear mount 212 holds the ring gear 215 at a substantially constant axial location relative to the ring gear stator 214 and in substantially the same plane; the plane being normal to the nominal principal axis of the gear box.

The stator 214 may be fixedly attached to an engine casing or other static structure, in which case the stator 214 may betaken to include any such structure.

The ring gear 215 includes two axially separated internal gears 222 and a mounting plate 224. Each internal gear includes a toothed track (not shown) for engagement with a corresponding planet gear as is well known in the art. The teeth of the internal gear may helical.

A radial flange projects from the outboard surface internal gears to provide an attachment for attaching the internal gear to the mounting plate 224. The internal gears and radial flange are full annuli, but the radial flange may be segmented, if appropriate.

The mounting plate 224 includes axially separated attachments which correspond and attach to the radial flanges of the internal gears. In the example, the attachment between the mounting plate 224 and the radial flanges of the internal gears is via a full annulus bolted abutment, although other arrangements may be possible.

A further radial flange 226 is provided on the outboard side of the mounting plate 224 and extends towards the ring gear mount 212. The mounting plate radial flange 224 includes a plurality of fixtures for attaching the torsion couplings to the mounting plate 224 and thus ring gear 215. The fixtures may be equidistantly spaced around the circumference of the mounting plate radial flange 224 and have positions and a number which corresponds to the torsion couplings.

In the example of FIGS. 2 to 8, the coupling 216 is in the form of a torsion coupling having two principal elements. The first is a torsion bar 228 which extends from a fixed end to a torqued end. The second is a drive arm 218 which extends from the ring gear 215 to the torqued end of the torsion bar 228. The drive arm 218 provides a coupling which transfers the relative radial or rotational movement of the ring gear 215 to provide a torque on the torsion bar 228. The fixed end of the torsion bar 228 is attached to the ring gear stator 214 or an extension thereof in the form of an associated static structure such as the engine casing. Hence, the ring gear stator 214 may include the engine casing or gear box or other ancillary housing or an appendage therefrom.

The drive arm 218 may be a single piece or, as in the described example of FIGS. 2 to 8, may comprise two elongate rigid members which are pivotably connected to each other. The first end of the first drive member 232 is pivotably connected to the radial flange of the mounting plate 224 and extends to the pivot connection with the second drive member 234. The second drive member 234 extends from the pivot connection towards a second end which is fixedly attached to the torsion bar 228.

The drive members are elongate members each having a longitudinal axis. The longitudinal axes of the first and second drive members 232, 234 are acutely inclined to one another when in a neutral or unloaded position. The angle between the first and second drive members 232, 234 will be determined by the requirements of the coupling and expected forces and movements on the ring gear. However, a typical range of angles will be between 0 degrees and 30 degrees.

A neutral position corresponds to the position when the resilient member is not biased. In the case where the drive members are curved, the longitudinal axis of the drive members may be provided by the line which extends between their respective connection point ends.

It can be seen from the Figures that the second drive member 234 is shorter between connection points than the first drive member 232. However, the relative lengths could be optimised based on the desired stiffness in lateral and torsional load cases and the torsion bar stiffness that could be provided. The connection between the first end of the drive arm 218 and the radial flange of the mounting plate 224 is a pivot in the form of a rotatable connection. The arrangement is such that the drive arm 218 is rotatable in the plane of the ring gear. The connection to the torsion bar 228 is fixed such that the torque applied by the drive arm 218 loads the torsion bar 228. The pivot connection between the first and second drive member 234 is via a pin or axled coupling. All of the rotatable connections which provide the pivots will typically include some form of bearing.

The first drive member 232 is provided by two elongate parallel plates, each of which extend from opposing sides of the radial flange of the mounting plate 224 at the first end, and enclose the second drive arm 218 therebetween at the second end. The pivot connections at the first and second end of the first drive member 232 are provided by respective bearings. The second drive member 234 is provided by a single bar, in the example of FIGS. 2 to 8. It will be appreciated that the first and second drive members 232, 234 may each be made from single or multiple members as required.

The drive arm 218 is such that it allows rotation and radial displacement of the ring gear 215 relative to the stator 214, whilst providing axial restraint. Rotation or radial movement of the ring gear 215 causes the deflection of the first and second drive members 232, 234 and the rotation of the connection end of the drive arm 218 thus the loading of the torsion bar 228.

The torsion bar 228 is an elongate member having a longitudinal axis. In the example, the longitudinal axis of the torsion bar 228 extends axially so as to be substantially parallel to the nominal rotational axis of the gearbox. The bar extends from the drive arm 218 connection end to a fixed end which is held in a relatively stationary relation to the ring gear stator 214.

The ring gear stator 214 provides a support structure for the torsion bar 228 and second end of the drive arm 218. The support provided by the stator 214 allows the position of the torqueing arm to be radially and axially constant with respect to the stator 214 and each other, whilst allowing the torsion bar 228 to be torqued. In the example shown, the stator 214 provides rotational support of the torsion bar 228 which helps prevent any radial deflections under torsional loading.

The rotatable support of the torsion bar 228 in the example of FIGS. 2 to 8 are provided by a bearing arrangement. The bearing arrangement may include one or more bearings 236. In the example shown, the bearing arrangement includes a pair of axially separated bearings 236 which are spaced along the length of the torsion bar 228. One bearing is placed local to a terminal end of the torsion bar 228; the other is placed at a mid-length location. The connection of the drive arm 218 is located between the first and second axially separated bearings.

In order to provide support for the two bearing locations, the ring gear stator 214 includes a corresponding number of axially separated plates or flanges, each of which provides a mounting for the outer race of a bearing. The flanges extend from a radially outer base portion and lie substantially normal to the rotational axis of the gearbox. The mounting for the bearings may be provided in the form of an aperture in which the bearing is mounted. Each of the bearings receives and provides rotatable support for the torsion bar 228.

In the example shown, the axially separated plates each have concentrically arranged bearing apertures which are spaced either side of the drive arm connection point. Thus, the drive arm connection point 238 sits between two axially spaced plates of the stator 214. The first and second bearings may be provided with different sized apertures which carry different sized bearings such that the first and smaller bearing can pass through the aperture provided for the second and larger bearing. Further, the bearing surface of the torsion bar 228 may be reduced from one bearing surface to the other. Hence, the first bearing surface has a first diameter, and a second bearing surface has a second diameter which is larger than the first, and the drive arm connection portion of the bar may have a third diameter which is between the first and second diameter in size. Hence, the outer profile of the torsion bar 228 includes a stepped profile which incrementally increases from a first end to the drive arm connection point, to the second bearing location. This allows the torsion bar 228 to be received into the stator plates from a first direction thereby easing assembly.

In an alternative construction, the torsion bar 228 may include only one bearing with the one of the plates providing a fixation point against which the torsion bar 228 can be loaded in use.

The fixed end of the torsion bar 228 may be attached directly to a portion of the ring gear stator 214 or an extension thereof. In the example shown, the fixed end of the torsion bar 228 is attached to the stator 214 via a lever 240. The lever 240 is in the form of a rigid elongate bar which extends from the torsion bar 228 at a first end, to a second end which is attached to a static structure which is axially adjacent to the ring gear stator 214.

Thus, in axial series relative to the longitudinal axis of the torsion bar 228, there is provided a first fixed end comprising a lever 240, a first bearing portion, a drive arm connection and a second bearing.

The connection between the torsion bar 228 and drive arm 218 is in the form of a spline which prevents the relative rotation between the two components. Other non-rotating connections may be possible. The connection between the torsion bar 228 and the lever 240 may also be in the form of a spline to prevent relative rotation.

The number of torsion couplings is dictated by a number of factors. These include: the amount of torque generated by the gearbox, which, for an epicyclic gearbox as described above is the difference between the input and output torque; the space available for the torsion bars; and the number of drive arms used. The number of drive arms may be the same as the number of torsion bars. The minimum number of torsion couplings required is two and these are ideally diametrically opposed on the ring gear. The maximum number of torsion couplings required is unlikely to be more than twelve. In the example shown, there are ten torsion couplings.

To react the torque load from the ring gears, a support is required for torsion bar 228 in at least one position close to the drive arm connection. The support ideally permits small rotations of the torsion bar and linkages, and so a plain or spherical bushing may be used at these positions depending on the kinematic requirement of the gearbox. The size, length, angle of the drive members to each other and to the ring gear mount 212 are all variables which can be optimised to provide a particular layout. The torsion stiffness is another variable which can be constrained by the available space envelope; the level of torque to be reacted; the amount rotational movement that can be tolerated before the system becomes in balance and the amount of radial movements that the ring gear mount 212 must accommodate.

Figure 7:
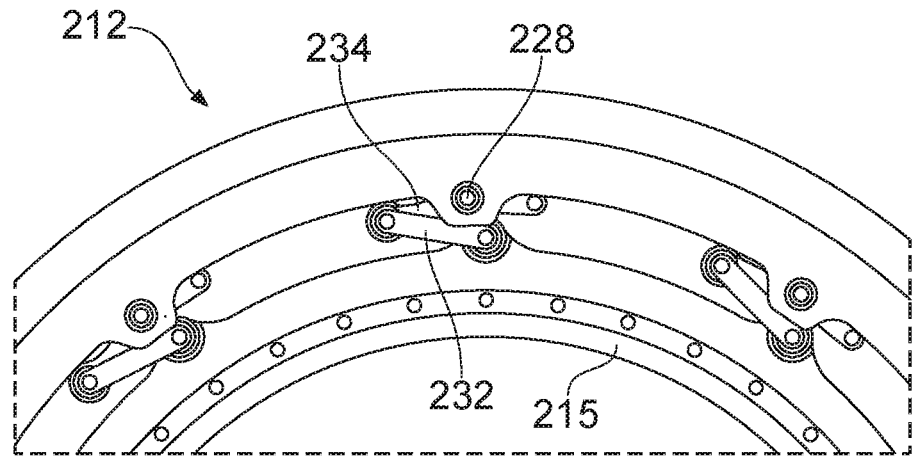
FIG. 7 shows a portion of the ring gear mount of FIG. 2 at rest.
Figure 8:
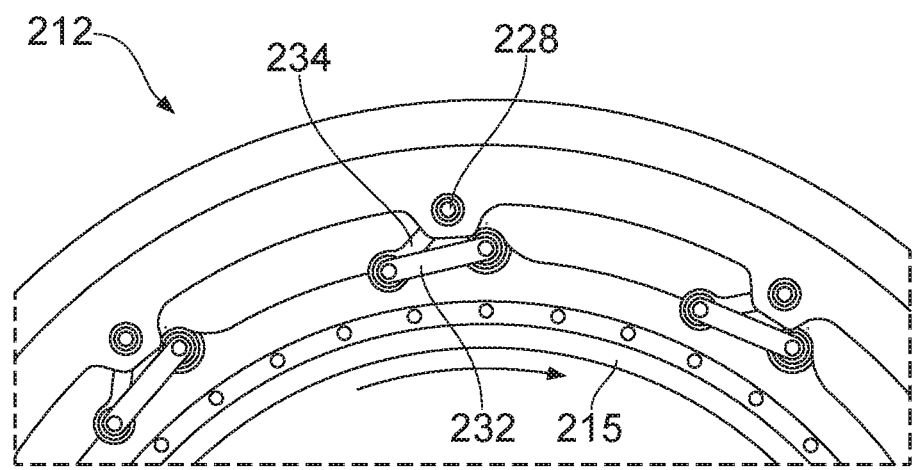
FIG. 8 shows a portion of the ring gear mount of FIG. 7 under torsion load.

In use, as the engine powers up, torque is generated in the ring gear 215. FIG. 7 shows the ring gear at rest. FIG. 8 shows the ring gear under torque and rotating in the direction of the applied torque which alters the angle that the drive members make with each other. The angle that the first drive member 232 makes is changed from the at rest state, thereby imparting a twisting moment into the torsion bar 228 via the second drive member 234 to which it is mechanically joined. The drive members will continue to move until the combined torque imparted into the torsion bars balances the torque applied by the ring gear 215 so as to put the system in equilibrium. Further, the ring gear mount 212 allows the ring gear 215 to self-centralise and lateral movements can be accommodated by some torsion bars being unwound and others being wound up.

Provided are drive arms 218 with two acutely angled drive members at a plurality of positions around the periphery of an epicyclic gearbox ring gear mount system. By connecting a torsion bar 228 to one of the paired links at multiple positions, the torque generated by the ring gear mount 212 can be balanced by the combined action of the torsion bars. This allows the ring gear mount system to follow the position of the epicyclic gearbox planetary gears without imposing excessive loads on the gear teeth whilst also fully reacting the torque generated by the gearbox ring gear mount system. The ring gear mount allows compact packaging and weight savings compared with existing systems.

Figure 9:
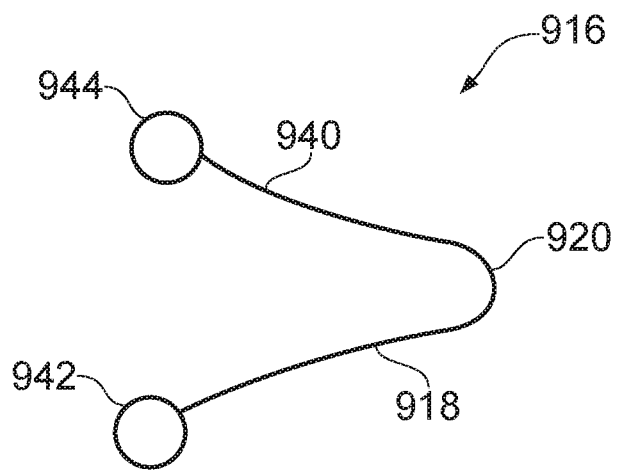
FIG. 9 shows an alternative example of a ring gear mount.

The torsion bars could be replaced by different sources of resilience. For example, as shown in FIG. 9, the coupling 916 may include a resiliently deformable member or bar which is flexurally resilient rather than torsionally resilient. Thus, the coupling can be formed from a drive arm 918, lever 940 and resiliently biased connection 920 in an end to end series arrangement and may be formed as a unitary body including an integral resiliently biased portion. The shape of the coupling in this instance has a similar approximate V-shape to the aforedescribed example. Thus, the coupling includes in series connection: a connection with the ring gear 942, a drive arm 918, a resiliently deformable connection 918 and a lever 940 which connects to the stator 944. In this example, the resiliently deformable connection provides an inflection or hinge portion between the drive arm and lever. The drive arm, resiliently deformable connection and lever all lie in a common plane.

It will be appreciated, that the connection between the lever and the stator may include a further resiliently deformable portion. In other examples, the shape and or material of the coupling may add to the resilient deformation making the drive arm 218 and resiliently deformable component and lever a common structure. The respective connections between the ring gear and stator resiliently biased connection and may be achieved using a spline or other suitable connection.

Figure 10:
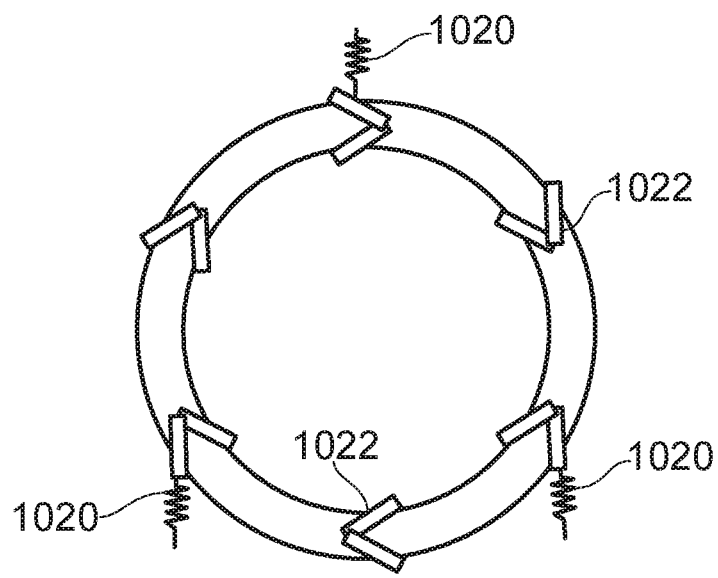
FIG. 10 shows an example of a ring gear mount in which a select number of the couplings include a resiliently deformable member.

FIG. 10 shows a simplified ring gear schematic in which the couplings include a first group having resiliently deformable connections 1020, and a second group 1022 having simple couplings with no resiliently deformable connections. In the example shown, the first group is smaller than the second group and may contain as few as two diametrically opposed resiliently deformable couplings, with the others belonging to the second group which simply provide location radial and axial locations of the ring gear.

It will be understood that the invention is not limited to the described examples and embodiments and various modifications and improvements can be made without departing from the concepts described herein and the scope of the claims. Except where mutually exclusive, any of the features may be employed separately or in combination with any other features in the disclosure extends to and includes all combinations and sub-combinations of one or more described features.

The invention claimed is:

1. A ring gear arrangement, comprising:
a ring gear mount comprising:
- a ring gear having at least one internal gear for interaction with one or more gear wheels;
- a ring gear stator; and,
- a plurality of first couplings which locate the ring gear within the gear stator, each coupling having (i) a first drive arm connected to the ring gear and (ii) a resiliently deformable connection,
wherein the first drive arm is movable between a first position in which the ring gear is in a rest position and a second position in which the ring gear has undergone some radial or rotational movement relative to the ring gear stator, wherein movement of the first drive arm from the first position to the second position loads the resiliently deformable connection against the ring gear, wherein the resiliently deformable connection biases the first drive arm to return to the first position when in the second position, wherein the resiliently deformable connection is a torsion bar.

2. The ring gear arrangement as claimed in claim 1, wherein the ring gear has a principal axis about which the one or more gear wheels rotate, and the longitudinal axis of the torsion bar lies parallel to the principal axis.

3. The ring gear arrangement as claimed in claim 2, wherein the first drive arm includes a first drive member and a second drive member in series connection between the ring gear and ring gear stator.

4. The ring gear arrangement as claimed in claim 3, wherein the drive members are elongate members each having a longitudinal axis, wherein the longitudinal axes of the first and second drive members are acutely inclined to one another when the ring gear is in a neutral position.

5. The ring gear arrangement as claimed in claim 4, wherein the angle between the longitudinal axes of the first and second drive members in the neutral position is between 0 and 30 degrees.

6. The ring gear arrangement as claimed in claim 1, wherein a first end of the first drive arm connects to the ring gear and a second end of the first drive arm connects to the torsion bar at a torqued end, and the opposing end of the torsion bar connects to a static structure.

7. The ring gear arrangement as claimed in claim 1, wherein each first drive arm lies in an orthogonal plane to the longitudinal axis of the torsion bar, each orthogonal plane being the same as or parallel to a plane normal to the central axis of the ring gear.

8. The ring gear arrangement as claimed in claim 1, wherein the resiliently deformable connection is connected to the ring gear stator via a lever.

9. The ring gear arrangement as claimed in claim 1, wherein the torsion bar is rotatably supported by the ring gear stator via a rotatable support.

10. The ring gear arrangement as claimed in claim 9, wherein the rotatable support is provided by a bearing arrangement.

11. The ring gear arrangement as claimed in claim 8, wherein the resiliently deformable connection extends through the ring gear stator.

12. The ring gear arrangement as claimed by claim 1, further comprising a plurality of second couplings comprising a second drive arm and no resiliently deformable connection.

13. The ring gear arrangement as claimed in claim 1, wherein the first drive arm and resiliently deformable connection lie in a common plane.

14. The ring gear arrangement as claimed in claim 13, further comprising a lever that is in an end-to-end series arrangement with the first drive arm, the lever and the first drive arm being joined by a resiliently deformable hinge portion that constitutes the resiliently deformable connection.

15. The ring gear arrangement as claimed in claim 14, wherein the first drive arm and the resiliently deformable hinge are a unitary body.

16. A planetary gear box having the ring gear arrangement as claimed in claim 1.

17. A gas turbine engine including the planetary gear box according to claim 16.

* * * * *